US007904827B2

(12) United States Patent
Taniguchi et al.

(10) Patent No.: US 7,904,827 B2
(45) Date of Patent: Mar. 8, 2011

(54) STICKY NOTE DISPLAY PROCESSING DEVICE AND STICKY NOTE DISPLAY PROCESSING METHOD

(75) Inventors: Yasunori Taniguchi, Ishikawa (JP); Naoyoshi Kiku, Ishikawa (JP)

(73) Assignee: PFU Limited, Ishikawa (JP)

( * ) Notice: Subject to any disclaimer, the term of this patent is extended or adjusted under 35 U.S.C. 154(b) by 925 days.

(21) Appl. No.: 11/819,013

(22) Filed: Jun. 25, 2007

(65) Prior Publication Data

US 2008/0136833 A1 Jun. 12, 2008

(30) Foreign Application Priority Data

Dec. 12, 2006 (JP) ................................ 2006-335056

(51) Int. Cl.
*G06F 3/00* (2006.01)

(52) U.S. Cl. .......... 715/788; 715/790; 715/792; 382/321

(58) Field of Classification Search .................. 715/764, 715/765, 781, 788, 790, 794, 800, 792; 382/321; 358/474; 345/581
See application file for complete search history.

(56) References Cited

U.S. PATENT DOCUMENTS

| | | | | |
|---|---|---|---|---|
| 6,006,142 | A * | 12/1999 | Seem et al. | 700/276 |
| 7,561,289 | B2 * | 7/2009 | Talley et al. | 358/1.15 |
| 2002/0066782 | A1 * | 6/2002 | Swaminathan et al. | 235/375 |
| 2005/0055646 | A1 * | 3/2005 | Melzer | 715/794 |
| 2005/0091578 | A1 * | 4/2005 | Madan et al. | 715/512 |
| 2005/0223315 | A1 * | 10/2005 | Shimizu et al. | 715/512 |
| 2006/0095857 | A1 * | 5/2006 | Torvinen | 715/764 |
| 2006/0200778 | A1 * | 9/2006 | Gritzman et al. | 715/781 |
| 2007/0027926 | A1 * | 2/2007 | Kinouchi et al. | 707/104.1 |
| 2007/0180401 | A1 * | 8/2007 | Singh et al. | 715/794 |
| 2007/0285721 | A1 * | 12/2007 | Sato | 358/1.18 |
| 2007/0288864 | A1 * | 12/2007 | Keereepart et al. | 715/790 |
| 2008/0034317 | A1 * | 2/2008 | Fard et al. | 715/781 |
| 2009/0288036 | A1 * | 11/2009 | Osawa et al. | 715/794 |

FOREIGN PATENT DOCUMENTS

| | | |
|---|---|---|
| EP | 1 526 463 A1 | 4/2005 |
| JP | 05-216932 | 8/1993 |
| JP | 2006-335056 A | 8/1993 |

OTHER PUBLICATIONS

Office Action dated Oct. 8, 2008.

* cited by examiner

*Primary Examiner* — Xiomar Bautista
(74) *Attorney, Agent, or Firm* — Lowe, Hauptman, Ham & Berner, LLP

(57) ABSTRACT

A sticky note display processing device is connected to an image reading device and a display device and is provided with at least a storage device and a control device. The control device includes image reading unit that controls the image reading device to read an image on a sticky note, and display controlling unit that adjusts a size of the image that should be displayed on a display screen of the display device, and controls a position of the image in such a manner that the image is displayed at a portion of the display screen where there is no display.

12 Claims, 18 Drawing Sheets

STICKY NOTE DISPLAY PROCESSING DEVICE AND STICKY NOTE DISPLAY PROCESSING METHOD

RELATED APPLICATIONS

The present application is based on, and claims priority from, Japanese Application Number 2006-335056, filed Dec. 12, 2006, the disclosure of which is hereby incorporated by reference herein in its entirety.

BACKGROUND OF THE INVENTION

1. Field of the Invention

The present invention relates to a sticky note display processing device and a sticky note display processing method, and in particular, to a sticky note display processing device and a sticky note display processing method for displaying an image of a sticky note on a display screen.

2. Description of the Related Art

When a read image is displayed, the display size of the image has conventionally been determined on the basis of the resolution of the image or pixel number of the image.

A system disclosed in JP-A-5-216932 is to read a memo or the like by, for example, a scanner through an photoelectric conversion, recognize characters or attributes of items in plural areas in a page, and store and manage the recognized characters and attributes of items as associated with each other.

However, the conventional method entails a problem that the display size becomes too large depending upon the resolution or pixel number, so that the image occupies the display screen. Alternatively, the conventional method entails a problem that the display size becomes too small depending upon the resolution or pixel number, so that the readability is deteriorated.

Further, the conventional method does not include means that displays a read image of a sticky note at an appropriate position on a display screen such as a desktop screen, so that the conventional method entails a problem that the display of an icon or the like is hidden by the display of the image of the sticky note.

The system disclosed in JP-A-5-216932 can store and manage a read image of a memo etc., but the system entails a problem that it does not include means that decides how to configure to display the memo etc. on a display screen.

SUMMARY OF THE INVENTION

The present invention has been accomplished in view of the above-mentioned circumstance, and an object of the invention is to provide a sticky note display processing device and a sticky note display processing method that can efficiently and automatically display as many images as possible on a display area of a limited display screen, when an image of a memo (sticky note) taken by an image taking device such as a scanner or a digital camera is displayed onto a display screen such as a desktop of a computer.

A sticky note display processing device according to one aspect of the present invention is connected to an image reading device and a display device and is provided with at least a storage device and a control device, wherein the control device includes image reading unit that controls the image reading device to read an image on a sticky note, and display controlling unit that adjusts a size of the image that should be displayed on a display screen of the display device, and controls a position of the image in such a manner that the image is displayed at a portion of the display screen where there is no display.

A sticky note display processing method according to another aspect of the present invention is executed by a sticky note display processing device connected to an image reading device and a display device and provided with at least a storage device and a control device, wherein the method includes an image reading step in which the image reading device is controlled to read an image on a sticky note, and a display controlling step in which a size of the image which should be displayed on a display screen of the display device is adjusted, and a position of the image having the size is controlled in such a manner that the image is displayed at a portion of the display screen where there is no display, wherein the steps being executed by the control device.

The present invention can automatically display a memo image or that like taken by a scanner or a digital camera at a free space of a display screen with an appropriate size (e.g., visible minimum size).

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 22 is a flowchart showing one example of the history information process for storing as associated with a deletion date or the like.

DETAILED DESCRIPTION OF THE PREFERRED EMBODIMENTS

A sticky note display processing device, sticky note display processing method and program, and a recording medium according to an embodiment of the present invention will be explained in detail with reference to the drawings. It should be noted that the present invention is not limited by this embodiment.

[Outline of the Invention]

Figure 1:
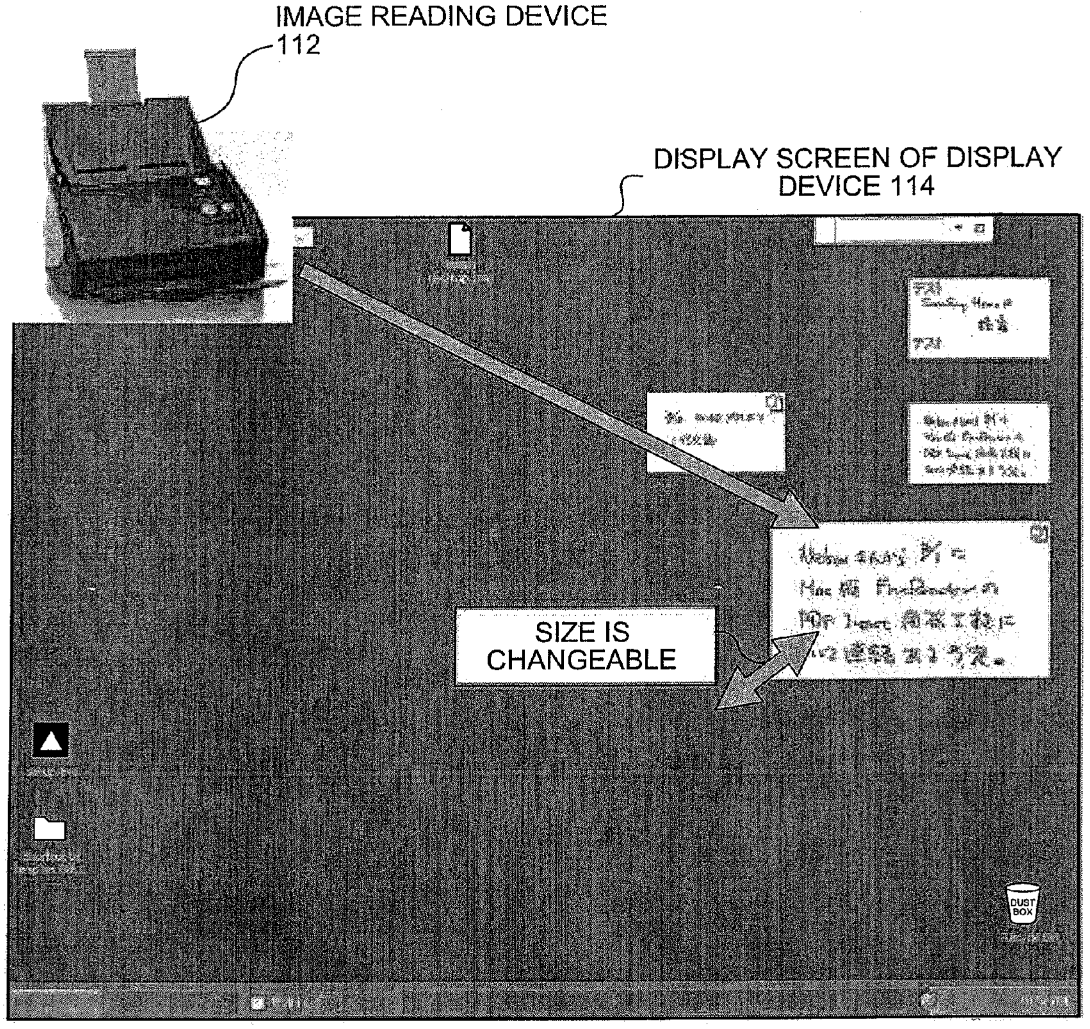
FIG. 1 is a principle structural view showing a basic principle of the present invention.

The outline of the present invention will first be explained, and then, the configuration, processing and the like of the present invention will be explained in detail. FIG. 1 is a principle structural view showing a basic principle of the present invention.

The present invention has schematically the following basic features. Specifically, the sticky note display processing device according to the present invention is connected to an image reading device 112 and a display device 114 as shown in FIG. 1.

The sticky note display processing device of the present invention controls the image reading device 112 so as to read an image of a sticky note.

The sticky note display processing device according to the present invention may be configured to realize an auto-cropping function for reading an image of a sticky note by controlling the image reading device 112 so as to detect linear portions through a differential process, selecting one at the outermost position among polygons composed of the detected linear portions, and extracting the image inside of the polygon.

Finally, the sticky note display processing device of the present invention adjusts a size of an image to be displayed on a display screen of the display device 114, and controls a position of the image in order that the image is displayed at a portion of the display screen where there is no display.

In the size adjusting, the sticky note display processing device of the present invention may be configured to determine a character area of a read image, adjust the size of the image on the basis of the determined character area, and control the image to be displayed as enlarged or reduced. The character area may be determined by encircling the individual character of the read image by a rectangle, and the size of the image may be adjusted on the basis of the area of the rectangle.

Here, in the position control, the display area of the display screen may be divided into plural sections, and the position of the image to be displayed on the display screen may be controlled by searching one or continuous plural sections where there is no display and that can display the image of the adjusted size.

Further, in the image display control, such a control may be made that a user is caused to input a priority of an image and an image is displayed as emphasized according to the priority or order of priority. Further, such a control may be made that a user is caused to designate a date and time relating to the image, and the image is displayed as emphasized according to a degree of grace based upon a period between the designated date and time and the current date and time. The specific examples for the emphasis display will be explained below in detail.

The above is the outline of the present invention. The present invention may be configured to realize a character recognizing function, link function, or log function.

[Configuration of Sticky Note Display Processing Device]

Figure 2:
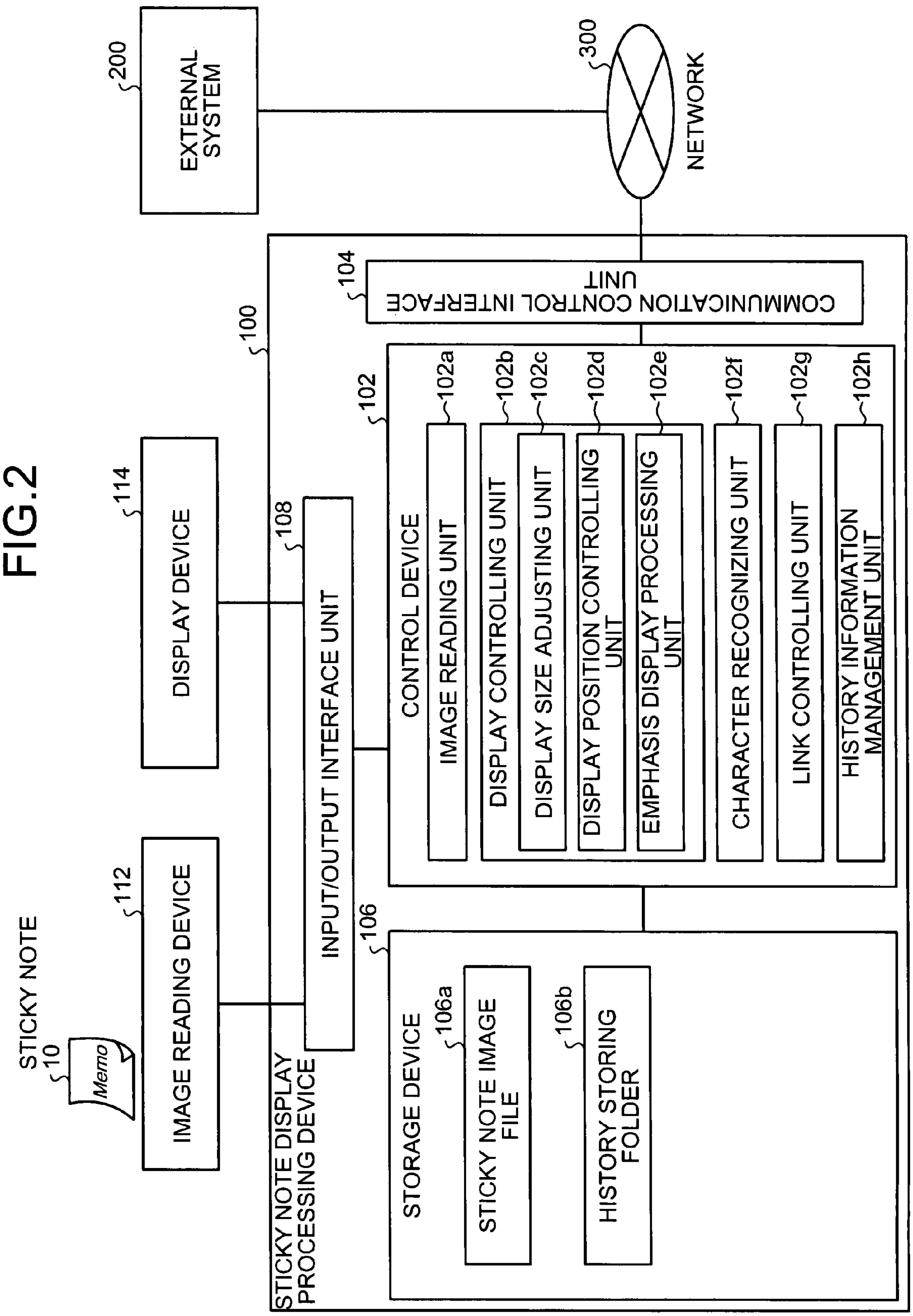
FIG. 2 is a block diagram showing one example of a configuration of a sticky note display processing device to which the present invention is applied.

First, the configuration of the sticky note display processing device will be explained. FIG. 2 is a block diagram showing one example of the configuration of the sticky note display processing device to which the present invention is applied. FIG. 2 conceptually depicts only the portions relating to the present invention. As shown in FIG. 2, the sticky note display processing device 100 is connected to the image reading device 112 and the display device 114.

In FIG. 2, the sticky note display processing device 100 is schematically configured to include a control device 102, such as a CPU, for generally controlling the overall of the sticky note display processing device 100, a communication control interface unit 104 connected to a communication device (not shown), such as a router, connected to a communication line or the like, an input/output control interface unit 108 connected to the image reading device 112 or display device 114, and a storage device 106 that stores various databases and tables etc. These units are connected via an arbitrary communication path so as to be communicable.

Various databases and tables (sticky note image file **106*a* or history storing folder 106*b*, etc.) stored in the storage device 106** are storage means for a fixed disk device or the like, and store various programs, tables, files, databases, etc. used for various processes.

The sticky note image file **106*a*, which is one of the components of the storage device 106, is sticky note image storing means that stores an image read through the control of the image reading device 112**.

The history storing folder **106*b* is history information storing that stores image information moved by the process of a history information management unit 102*h***, when a user gives an instruction to delete the image information.

In FIG. 2, the input/output control interface unit 108 controls the image reading device 112 and the display device 114.

The image reading device 112 is image reading means (device) that reads an image of a document such as a sticky note 10. Specifically, a scanner, a digital camera, a camera-equipped cellular phone or the like may be used as the image reading device 112.

The display device 114 is display means (device) that displays an image on a display screen. Specifically, such as a monitor (including a home television set) can be used as the display device 114.

In FIG. 2, the control device 102 includes an internal memory for storing a control program such as an OS (Operating System), a program of defining various processing procedures, and necessary data. The control device 102 performs information process for executing various processes by these programs. The control device 102 is configured to conceptually include an image reading unit 102*a*, display controlling unit 102*b*, character recognizing unit 102*f*, link controlling unit 102*g*, and history information management unit 102*h*.

The image reading unit 102*a* is image reading means that controls the image reading device 112 so as to read an image of the sticky note 10. The image reading unit 102*a* may be configured to read the image of the sticky note 10 by controlling the image reading device 112 so as to detect linear portions through a differential process, selecting one at the outermost position among polygons composed of the detected linear portions, and extracting the image inside of the polygon. Further, the image reading unit 102*a* may be configured to correct the image from the slope of the linear portion of the selected polygon.

As shown in FIG. 2, the display controlling unit 102*b* is display control means that adjusts a size of an image to be displayed on the display screen of the display device 114 and controls a position of the image in such a manner that the image is displayed at a portion of the display screen where there is no display. The display controlling unit 102*b* is configured to include a display size adjusting unit 102*c*, display position controlling unit 102*d*, and emphasis display processing unit 102*e* as shown in FIG. 2.

The display size adjusting unit 102*c* is display size adjusting means that adjusts a size of an image to be displayed on the display screen of the display device 114. The display size adjusting unit 102*c* may determine a character area of the read image by the process of the image reading unit 102*a*, adjust the size of the image on the basis of the determined character area, and control the image to be displayed as enlarged or reduced. The display size adjusting unit 102*c* may determine a character area by encircling the individual character of the read image with a rectangle, and adjust the size of the image on the basis of the area of the rectangle.

The display position controlling unit 102*d* is display position control means that controls the position of the image to be displayed at a portion of the display screen where there is no display. The display position controlling unit 102*d* may divide the display area of the display screen into plural sections, and control the position of the image to be displayed on the display screen by searching one or continuous plural sections where there is no display and that can display the image of the size adjusted by the process of the display size adjusting unit 102*c*.

The emphasis display processing unit 102*e* is emphasis display processing means that controls an image to be displayed as emphasized. The emphasis display processing unit 102*e* may control to cause a user to input a priority of the image and control the image to be displayed as emphasized according to the priority or order of priority (hereinafter referred to as "priority order"). Further, the emphasis display processing unit 102*e* may control to cause a user to designate a date and time relating to the image, and control the image to be displayed as emphasized according to the degree of grace based upon the period between the designated date and time and the current date and time. The emphasis display processing unit 102*e* may change a color of the image to be displayed, a color of a frame of the image, a thickness of a character of the image, a flickering interval of display of the designated date and time, a flickering interval of the image, or size, thickness or color of display of the designated date and time, so as to control the image to be displayed as emphasized. The emphasis display processing unit 102*e* may binarize an image, add plural black dots to the surrounding of a black dot of the binarized image, and superimpose the image with the original image, as a process for changing the thickness of the character of the image.

As shown in FIG. 2, the character recognizing unit 102*f* is character recognizing means that recognizes character information from an image.

As shown in FIG. 2, the link controlling unit 102*g* is link control means that causes a user to designate a file relating to an image displayed on the display screen by the display controlling unit 102*b*, and links the image with the designated file.

As shown in FIG. 2, the history information management unit 102*h* is history information management means that, when a user gives an instruction to delete image information, moves the instructed image information to the history storing folder 106*b* and refers to the image information (history information) stored in the history storing folder 106*b* according to the demand by the user.

The above is the configuration of the sticky note display processing device 100. The sticky note display processing device 100 may be connected to a network 300 so as to be communicable via a wired or wireless communication line such as a dedicated line or via a communication device such as a router. Specifically, the sticky note display processing device 100 may schematically be configured to be connected to an external system 200 that provides an external database relating to an image of a sticky note or an external program or the like such as a sticky note display processing program through the network 300 so as to be communicable.

In this case, in FIG. 2, the communication control interface unit 104 performs a communication control between the sticky note display processing device 100 and the network 300 (or communication device such as a router). Specifically, the communication control interface unit 104 has a function of communicating data to another terminal through the communication line. In FIG. 2, the network 300 has a function of connecting the sticky note display processing device 100 and the external system 200, e.g., Internet or the like. The external system 200 may be configured as WEB server or ASP server etc., and its hardware configuration may be made by an information processing device such as a commercially available work station or personal computer, and its attachment. Further, each function of the external system 200 is realized by a CPU device, disk device, memory device, input device, output device, communication control device, etc. in the hardware configuration of the external system 200 and program for controlling these devices.

[Sticky Note Display Process]

Figure 3:
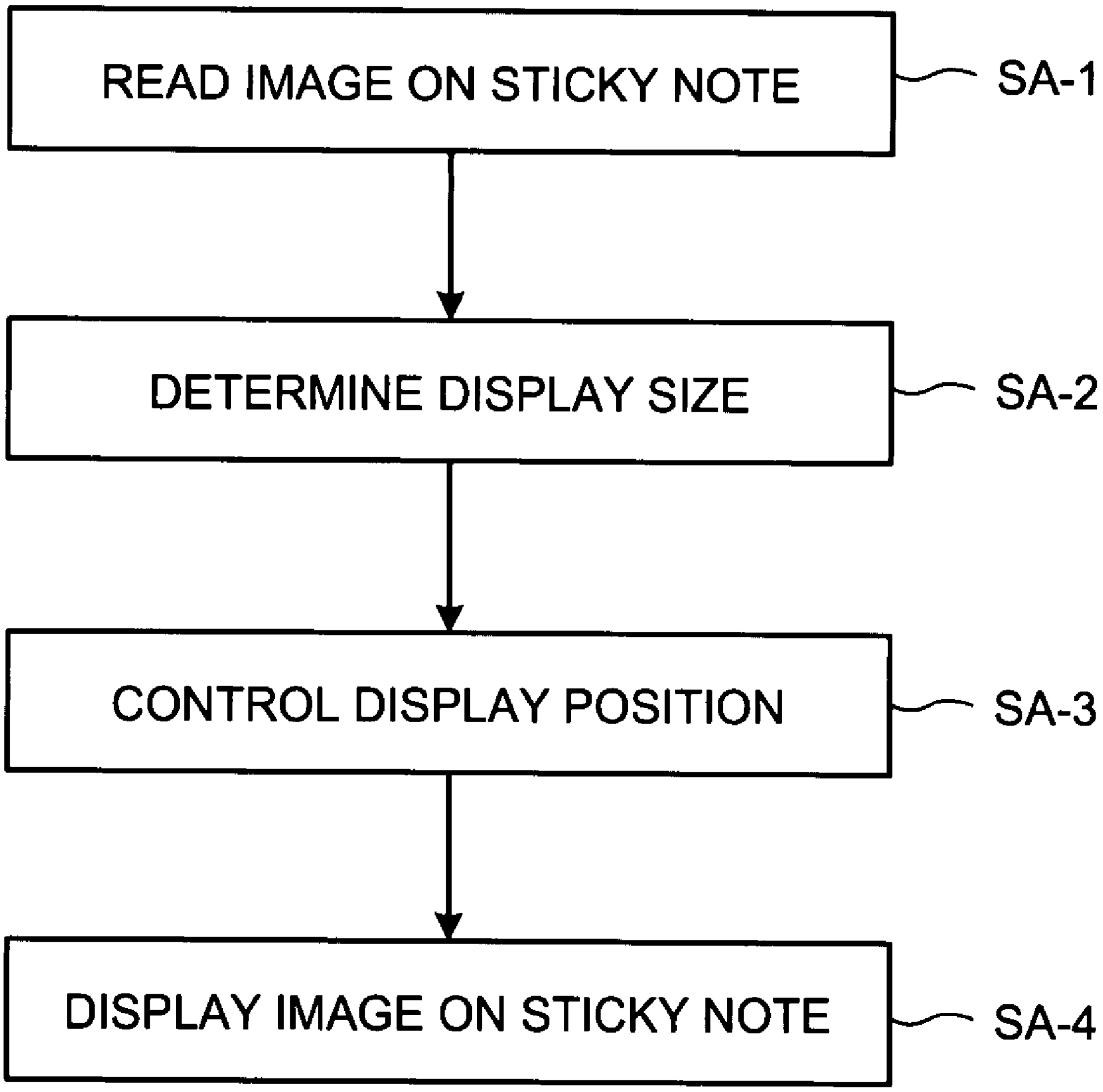
FIG. 3 is a flowchart showing one example of a sticky note display process in a sticky note display processing device 100.

Subsequently, one example of a process of the sticky note display processing device 100 according to the present embodiment thus configured will be explained in detail with reference to FIGS. 2 to 23. FIG. 3 is a flowchart showing one example of the sticky note display process in the sticky note display processing device 100.

As shown in FIG. 3, the image reading unit 102*a* controls the image reading device 112 so as to read the image of the sticky note 10 (step SA-1). Here, this image reading process may perform a process for realizing an auto-cropping function (auto-cropping process). The process for realizing the auto-cropping function will be explained below in detail.

Then, the display controlling unit 102*b* adjusts a size of an image to be displayed on the display screen of the display device 114 by the process of the display size adjusting unit 102*c* (step SA-2; display size adjusting process).

Then, the display controlling unit 102*b* controls a position of the image in such a manner that, by the process of the display position controlling unit 102*d*, the image having the adjusted size is displayed at a portion of the display screen of the display device 114 where there is no display (step SA-3; display position control process).

The display controlling unit 102*b* controls that the image of the sticky note 10 is displayed on the display screen of the display device 114 on the basis of the adjusted size and position (step SA-4). The display controlling unit 102*b* may be configured to display the image as emphasizing the character or the like described on the sticky note 10 by the process of the emphasis display processing unit 102*e*.

The above is the outline of the sticky note display process by the sticky note display processing device 100. The detail of each process in the present embodiment will now be explained below.

[Auto-Cropping Process]

Figure 4:
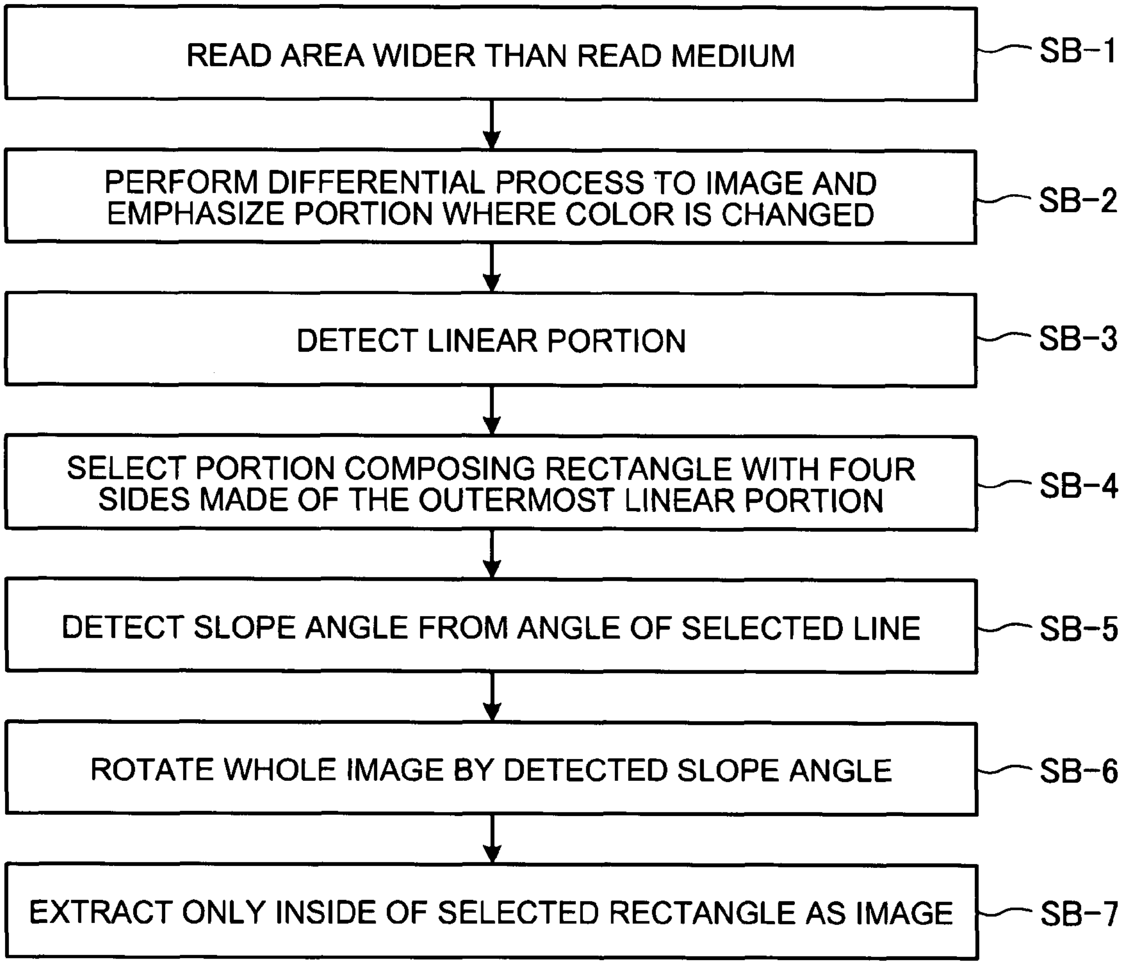
FIG. 4 is a flowchart showing one example of an auto-cropping process.

In the present embodiment of the sticky note display processing device 100, the image reading process may perform a process for realizing an auto-cropping function that extracts only the image of the sticky note 10 from the read image. FIG. 4 is a flowchart showing one example of an auto-cropping process.

As shown in FIG. 4, the image reading unit 102*a* first controls the image reading device 112 via the input/output control interface unit 108, thereby reading an area that is wider area than a read medium (e.g., the sticky note 10) (step SB-1).

Next, the image reading unit 102*a* performs a differential process for the read image so as to emphasize a portion where the color is changed (step SB-2).

Then, the image reading unit 102*a* detects a linear portion from the emphasized portion (step SB-3).

Then, the image reading unit 102*a* selects a quadrangle (e.g., rectangle) made of four sides of the outermost linear portions from the detected linear portions (step SB-4).

The image reading unit 102*a* detects a slope angle from an angle of the selected line (step SB-5).

The image reading unit 102*a* rotates the whole image by the detected slope angle, thereby correcting the inclination of the image (step SB-6).

The image reading unit 102*a* then extracts only the image inside of the selected quadrangle (e.g., rectangle) as the image of the sticky note 10 (step SB-7).

The above is the auto-cropping process. It is to be noted that the line to be detected may be a curved line, and the pattern to be made is not limited to a quadrangle, but may be a polygon such as a triangle, hexagon, octagon, or a circle according to the shape of the sticky note. When the sticky note is rectangle and the four corners of the selected quadrangle are not at right angles, the image reading unit 102*a* may perform an image processing for modifying the image so as to make four sides be at right angles to each other.

[Display Size Adjusting Process]

Figure 5:
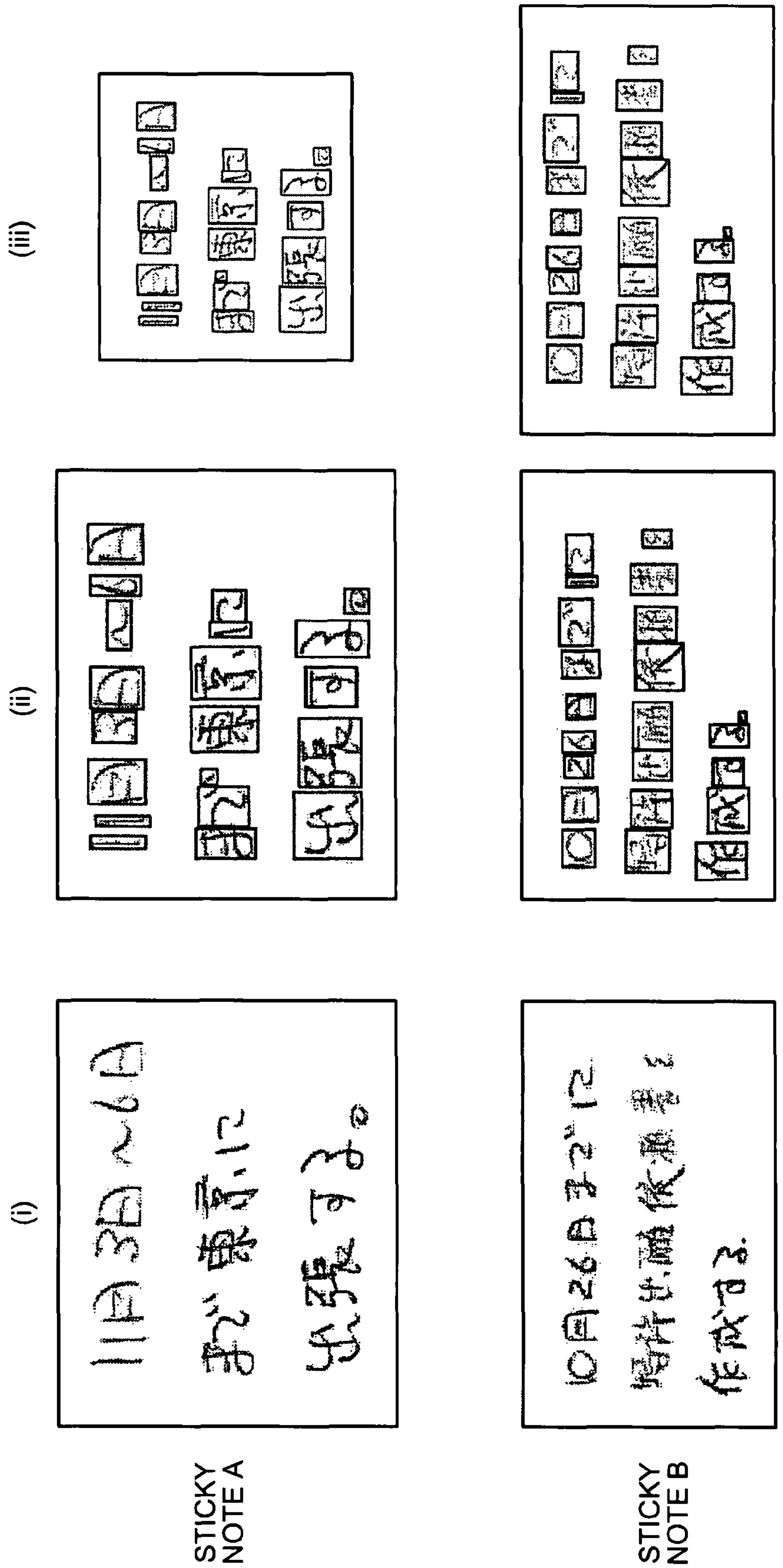
FIG. 5 is a conceptual view showing one example of a display size adjusting process of the sticky note display processing device 100 according to the present embodiment.
Figure 6:
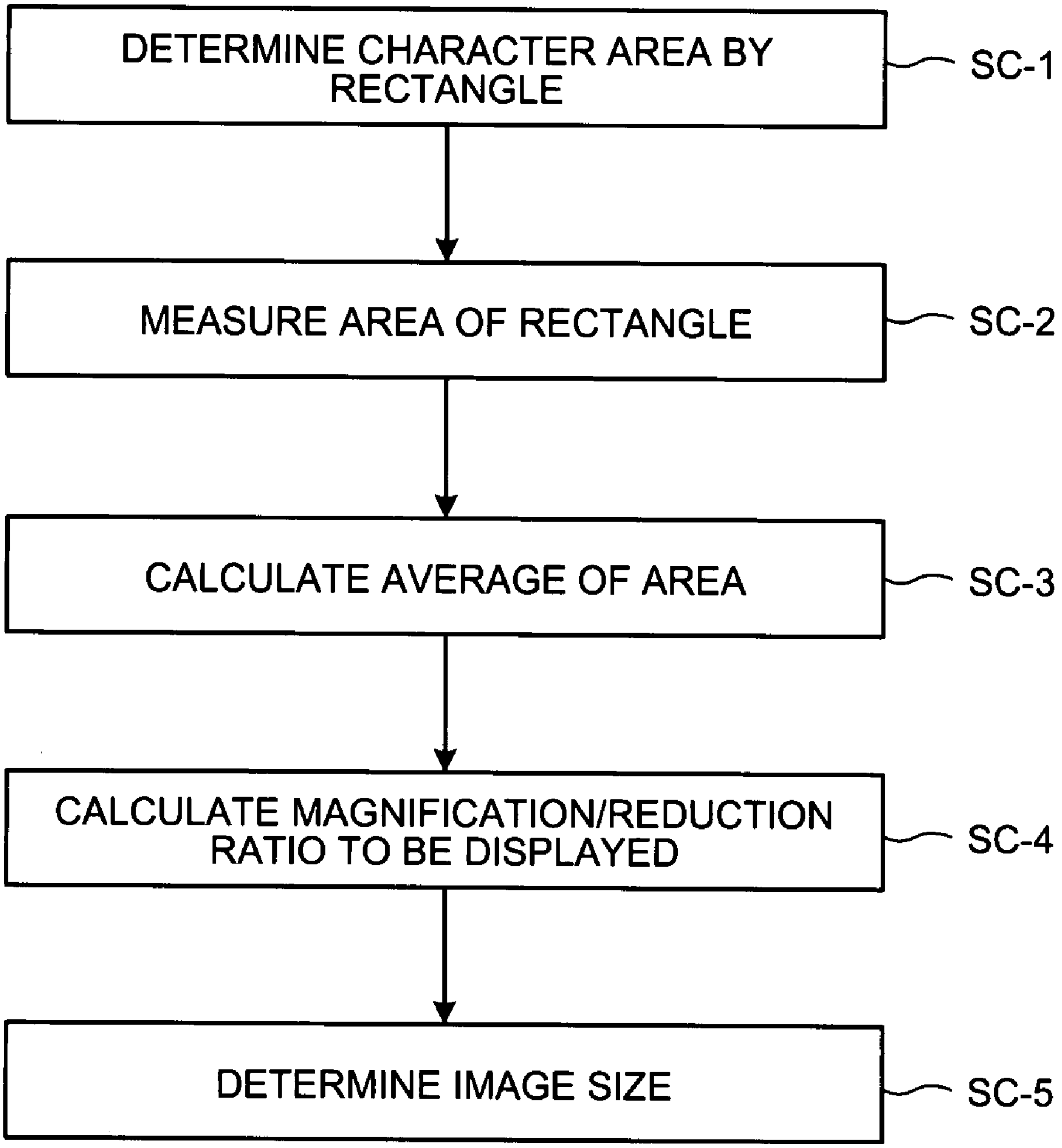
FIG. 6 is a flowchart showing one example of a display size adjusting process in the sticky note display processing device 100.

The detail of a display size adjusting process in the present embodiment will be explained with reference to FIGS. 5 and 6. FIG. 5 is a conceptual view showing one example of the display size adjusting process of the sticky note display processing device 100 in the present embodiment. FIG. 6 is a flowchart showing one example of the display size adjusting process in the sticky note display processing device 100.

As shown in FIG. 6, the display controlling unit 102*b* encircles the individual character of the image in the sticky note 10, which is read by the image reading unit 102*a*, by a rectangle to determine the character area by the process of the display size adjusting unit 102*c*, in order to adjust the size of the image to be displayed on the display screen of the display device 114 (step SC-1). Specifically, as shown in FIG. 5, the display size adjusting unit 102*c* encircles the individual characters or the like written on the image of the sticky note 10 (FIG. 5(*i*)) by a rectangle so as to be in contact with the segment, thereby determining the character area (FIG. 5(*ii*)).

Subsequently, the display controlling unit 102*b* adjusts the size of the image on the basis of the determined character area by the process of the display size adjusting unit 102*c*. Specifically, as shown in FIG. 6 as one example, the display size adjusting unit 102*c* measures the size (e.g., the area of the rectangle) of the "aggregate of the contacting lines" such as characters (step SC-2). Then, it calculates an average of the areas of the rectangles (step SC-3), and calculates a magnification ratio or reduction ratio of the image to be displayed on the basis of the calculated average of the area (step SC-4). Then, it adjusts the size of the image (image size) from the calculated magnification/reduction ratio (step SC-5).

In accordance with the image size adjusted by the process of the display size adjusting unit 102*c*, when the handwritten characters or the like are great, the display controlling unit 102*b* controls such that the characters are reduced to be displayed, and when the handwritten characters or the like are small, it controls such that the characters are enlarged to be displayed, while maintaining the visibility (FIG. 5(*iii*)). In the aforesaid process, the display size adjusting unit 102*c* may calculate only the magnification ratio or reduction ratio of the image instead of adjusting the size. Further, the display size adjusting unit 102*c* may be configured to calculate the magnification ratio or reduction ratio after adjusting the image size. The explanation of the display size adjusting process is now ended.

[Position Control Process]

Figure 7:
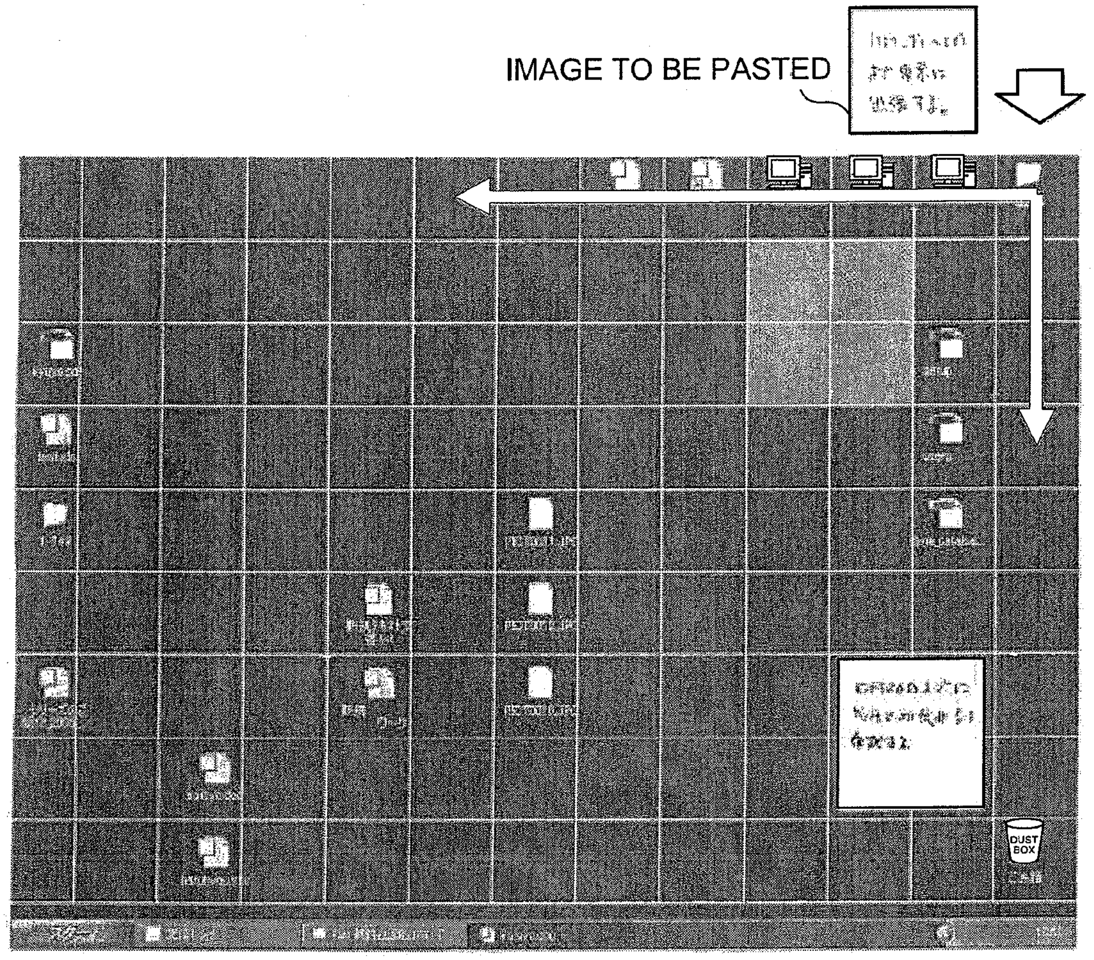
FIG. 7 is a conceptual view showing one example of a position control process in the sticky note display processing device 100 according to the present embodiment.

Subsequently, the detail of a position control process will be explained with reference to FIG. 7. FIG. 7 is a conceptual view showing one example of the position control process of the sticky note display processing device 100 in the present embodiment.

First, the display controlling unit 102*b* divides the display area of the display screen into plural sections (e.g., in a matrix) as shown in FIG. 7 by the process of the display position controlling unit 102*d* in order to control the position of the image in such a manner that the image is displayed on the portion of the display screen where there is no display.

Then, the display position controlling unit 102*d* controls the position of the image to be displayed on the display screen of the display device 114 by searching one or continuous plural sections that are the display areas where there is no display and that can display the size adjusted by the process of the display size adjusting unit 102*c*. The display position controlling unit 102*d* may sequentially search one or continuous plural sections that can display the size adjusted by the process of the display size adjusting unit 102*c* from the upper-right corner. As shown in FIG. 7, the display position controlling unit 102*d* may search the portion on the desk-top screen where icons or images of other sticky notes 10 are not displayed as the display area where there is no display.

The display controlling unit 102*b* controls the input/output control interface unit 108 in such a manner that the image of the sticky note 10 read by the process of the image reading unit 102*a* is displayed on the display screen of the display device 114 with the size adjusted by the process of the display size adjusting unit 102*c* at the position adjusted by the process of the display position controlling unit 102*d*. Thus, the position control process is completed.

[Character Recognizing Process]

A character recognizing process will be explained. Specifically, the character recognizing unit 102*f* recognizes character information from the read image of the sticky note 10. The character recognizing unit 102*f* may be configured to realize an OCR (Optical Character Recognition) function as one example. By virtue of this, when the handwritten characters are hard to be read, the display controlling unit 102*b* can display with a text font instead of the handwritten characters. The display controlling unit 102*b* may be configured to recognize the handwritten characters as the character information, and thereby execute a direct search from the image of the sticky note 10 with the recognized character information defined as a keyword. Accordingly, the image of the sticky note 10 displayed on the display screen can be realized as a searchable memo.

[Emphasis Display Process]

Subsequently, the detail of an emphasis display process by the process of the emphasis display processing unit 102*e* will be explained with reference to FIGS. 8 to 18. Specific examples of the emphasis display process such as "remind function", and "thickening process", and specific examples of the emphasis display based upon the "priority order" or "degree of grace" will be explained one by one.

[Remind Function]

Figure 8:
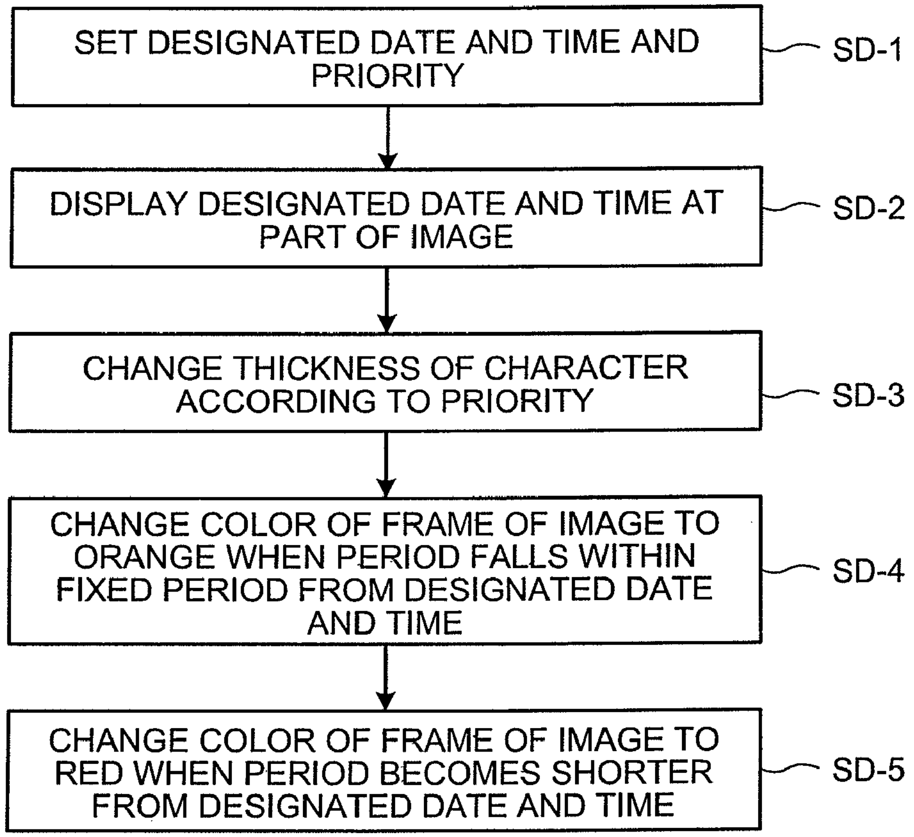
FIG. 8 is a flowchart showing one example of an emphasis display process.
Figure 9:
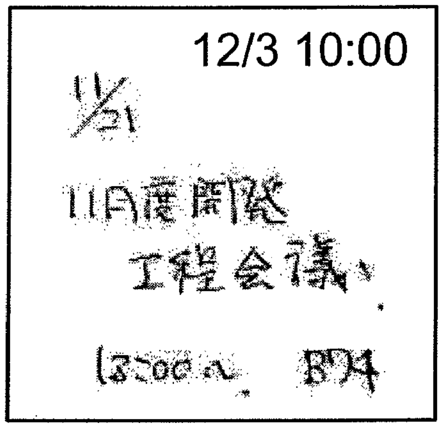
FIG. 9 is a view showing one example of an image displayed by the emphasis display process (remind function) of the sticky note display processing device 100 according to the present embodiment.
Figure 10:
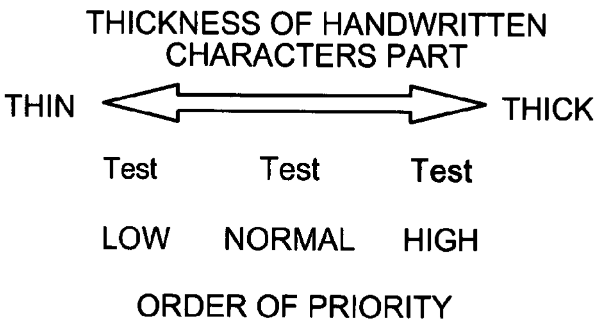
FIG. 10 is a conceptual view showing one example of an image process performed to change the thickness of handwritten characters on an image.
Figure 11:
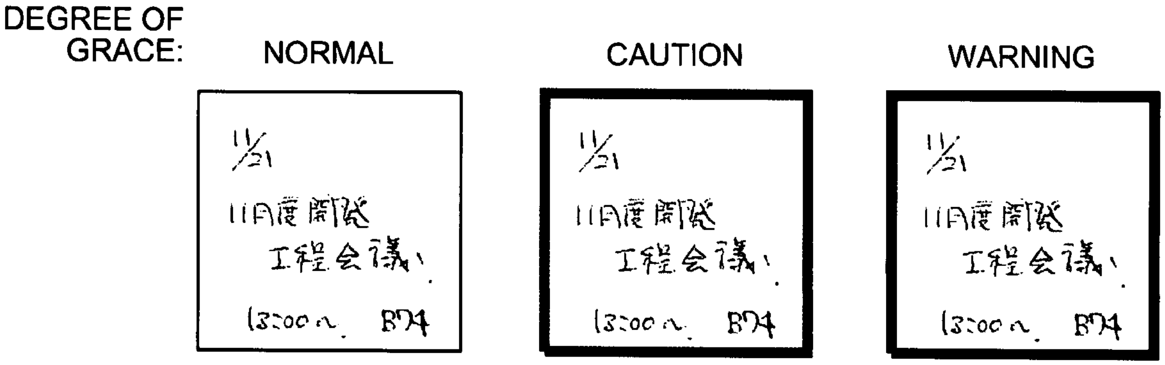
FIG. 11 is a view showing an example of a display in which a degree of grace up to a designated date and time is represented by a color of a frame of an image.

One example of the emphasis display process configured to realize the remind function will be explained with reference to FIGS. 8 to 11. FIG. 8 is a flowchart showing one example of the emphasis display process. FIG. 9 is a view showing one example of an image displayed by the emphasis display process (remind function) of the sticky note display processing device 100 in the present embodiment. FIG. 10 is a conceptual view showing one example of an image process executed to change the thickness of the handwritten characters on the image. FIG. 11 is a view showing a display example when the degree of grace up to a designated date and time is expressed by a color of a frame of the image.

As shown in FIG. 8, the emphasis display processing unit 102*e* first controls to cause a user to input/designate the priority of the image or date and time relating to the image (hereinafter referred to as "designated date and time") (step SD-1).

Then, the emphasis display processing unit 102*e* controls that the designated date and time is displayed in a part of the image as shown in FIG. 9 (step SD-2).

The emphasis display processing unit 102*e* changes the thickness of the characters in the image in accordance with the inputted priority or order of priority (step SD-3). Specifically, as shown in FIG. 10 as one example, the emphasis display processing unit 102*e* controls as follows. That is, when the order of priority is low, the handwritten characters in the image are displayed as unchanged; when the order of priority is normal, the handwritten characters in the image are boldly displayed; and when the order of priority is high, the handwritten characters in the image are more boldly displayed. The detail of the thickening process will be described below.

As shown in FIG. 11, when the difference between the designated date and time and the current date and time becomes within a fixed period, the emphasis display processing unit 102*e* determines that the degree of grace is a caution level, and controls that the frame of the image is displayed with a caution color (e.g., orange) (step SD-4).

When the difference between the designated date and time and the current date and time becomes within a fixed period that is shorter than the aforesaid fixed period, the emphasis display processing unit 102*e* determines that the degree of grace is a warning level, and controls that the frame of the image is displayed with a warning color (e.g., red) as shown in FIG. 11 (step SD-5). The level of the degree of grace based on the period between the designated date and time and the current date and time can freely be set. For example, the degree of grace may be defined as the caution level when the period is 24 hours, and the degree of grace may be defined as the warning level when the period is three hours. The caution color and warning color can freely be set.

[Thickening Process]

Figure 12:
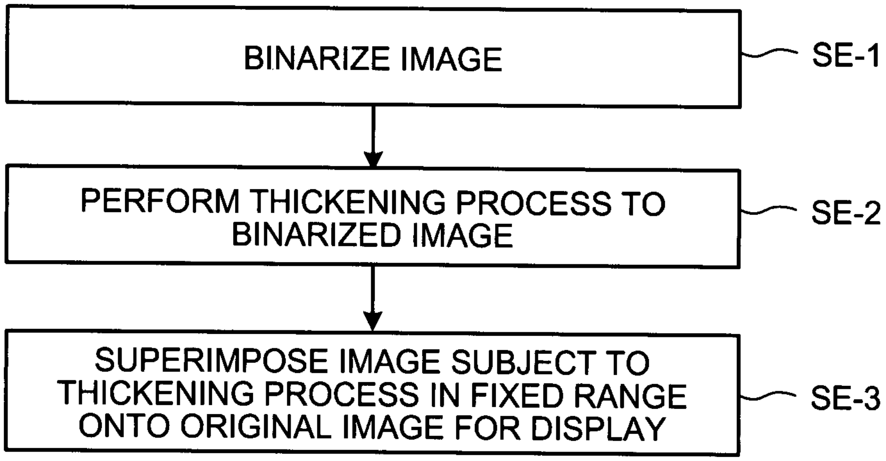
FIG. 12 is a flowchart showing one example of an image process including a thickening process.

The detail of the image process including the thickening process by the process of the emphasis display processing unit 102*e* will be described with reference to FIG. 12. FIG. 12 is a flowchart showing one example of the image process including the thickening process.

As shown in FIG. 12, the emphasis display processing unit 102*e* first binarizes the image of the sticky note 10 (step SE-1).

Next, the emphasis display processing unit 102*e* executes the thickening process to the binarized image (step SE-2). Specifically, the emphasis display processing unit 102*e* adds plural black dots to the surrounding of the black dot of the binarized image. Specifically, the emphasis display processing unit 102*e* adds black dot of a layer of one dot to the surrounding of the black dot of the binarized image, when the order of priority is normal. When the order of priority is high, the emphasis display processing unit 102*e* adds black dot of a layer of two dots to the surrounding of the black dot of the binarized image. On the other hand, the emphasis display processing unit 102*e* adds black dot of a layer of zero dot to the surrounding of the black dot of the binarized image when the order of priority is low.

Then, the emphasis display processing unit 102*e* controls such that the image subject to the thickening process and the original image are superimposed and displayed (step SE-3). Thus, the thickness of the handwritten characters in the image can be changed.

[Order of Priority: Thickness of Character of Designated Date and Time]

Figure 13:
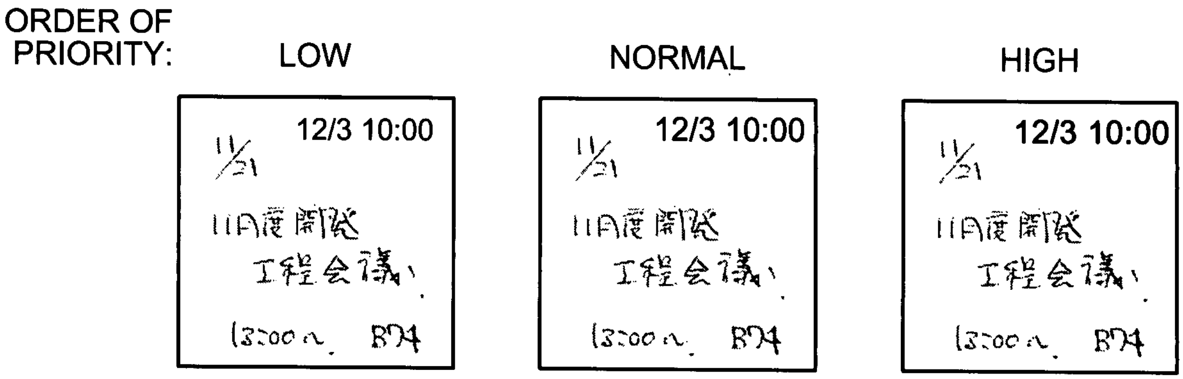
FIG. 13 is a view showing an example of a display in which the order of priority is represented by the thickness of the designated date and time.

The emphasis display processing unit 102*e* may control to change the thickness of the characters of the designated date and time to be displayed as the emphasis display process according to the order of priority. FIG. 13 depicts an example of a display in which the order of priority is expressed by the thickness of the designated date and time.

Specifically, as shown in FIG. 13, when the order of priority is normal, the emphasis display processing unit 102*e* represents the characters of the designated date and time to be displayed with a normal font. When the order of priority is low, the emphasis display processing unit 102*e* represents the characters of the designated date and time to be displayed with a thin font. When the order of priority is high, the emphasis display processing unit 102*e* represents the characters of the designated date and time to be displayed with a bold font.

[Degree of Grace: Color of Characters of Designated Date and Time]

Figure 14:
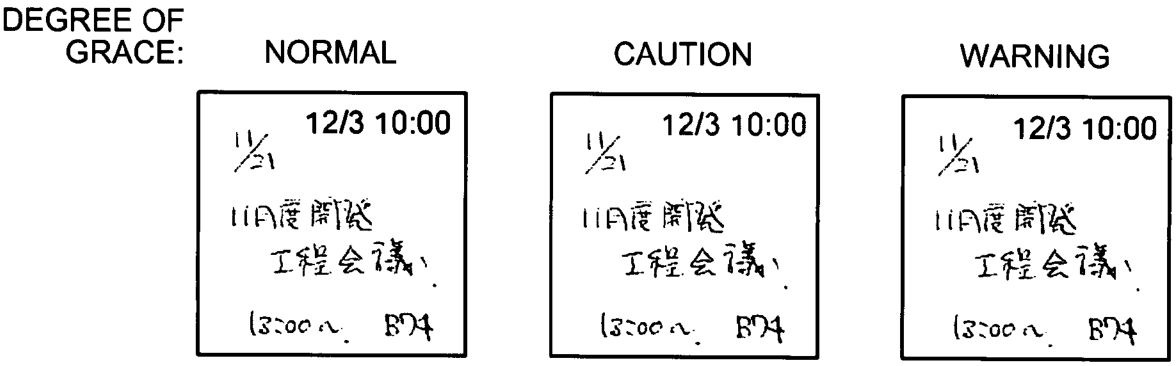
FIG. 14 is a view showing an example of a display in which the degree of grace up to the designated date and time is represented by a color of a character of the designated date and time.

The emphasis display processing unit 102*e* may control to change the color of the characters of the designated date and time to be displayed as the emphasis display process according to the degree of grace. FIG. 14 depicts an example of a display in which the degree of grace up to the designated date and time is expressed by the color of the characters of the designated date and time.

Specifically, as shown in FIG. 14, when the degree of grace is a normal level, the emphasis display processing unit 102*e* represents the characters of the designated date and time to be displayed with a normal color (e.g., monotone color). When the degree of grace is a caution level, the emphasis display processing unit 102*e* represents the characters of the designated date and time to be displayed with a caution color (e.g., orange). When the degree of grace is a warning level, the emphasis display processing unit 102*e* represents the characters of the designated date and time to be displayed with a warning color (e.g., red).

[Order of Priority: Size of Characters of Designated Date and Time]

Figure 15:
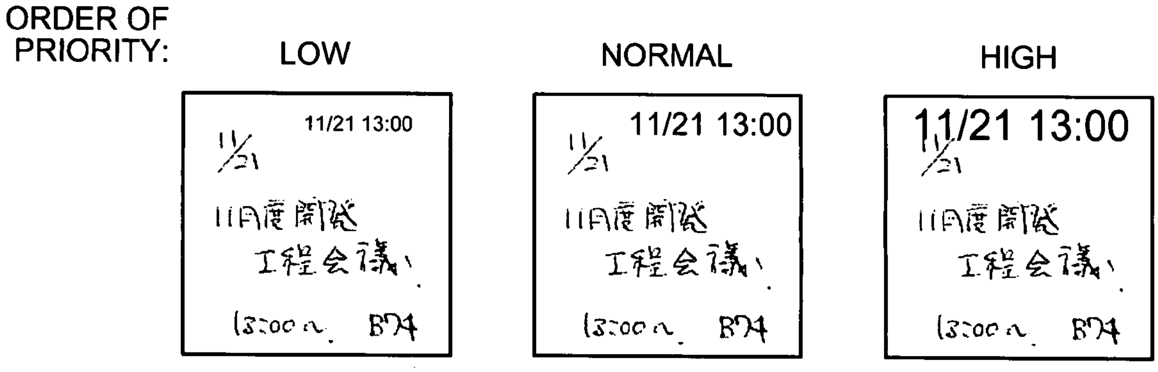
FIG. 15 is a view showing an example of a display in which the order of priority is represented by a size of a character of the designated date and time.

The emphasis display processing unit 102*e* may control to change the size of the characters of the designated date and time to be displayed as the emphasis display process according to the order of priority. FIG. 15 depicts an example of a display in which the order of priority is expressed by the size of the characters of the designated date and time.

Specifically, as shown in FIG. 15, when the order of priority is normal, the emphasis display processing unit 102*e* represents the characters of the designated date and time to be displayed with a font of a normal size (e.g., 12 points). When the order of priority is low, the emphasis display processing unit 102*e* represents the characters of the designated date and time to be displayed with a font of a small size (e.g., 10 points). When the order of priority is high, the emphasis display processing unit 102*e* represents the characters of the designated date and time to be displayed with a font of a large size (e.g., 14 points).

[Degree of Grace: Flickering Interval of Designated Date and Time]

Figure 16:
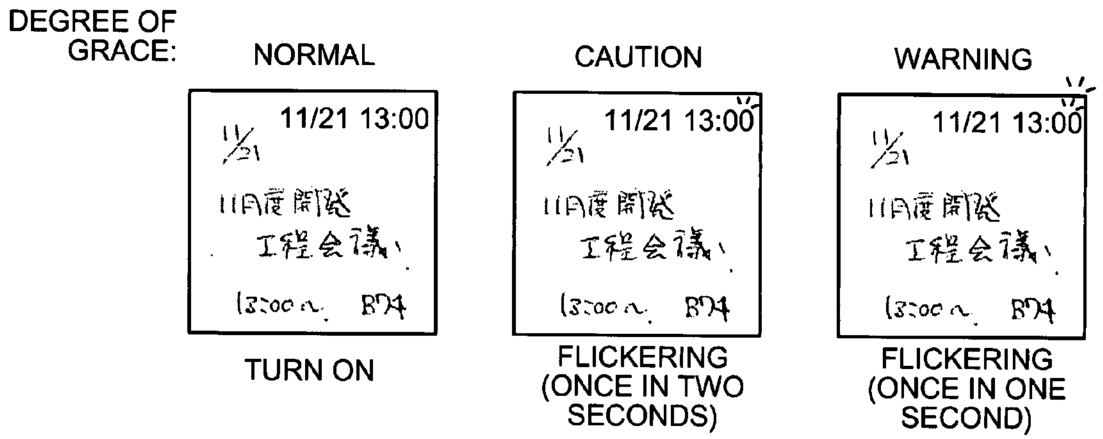
FIG. 16 is a view showing an example of a display in which the degree of grace up to the designated date and time is represented by a flickering interval of the displayed designated date and time.

The emphasis display processing unit 102*e* may control to change a flickering interval of a designated date and time to be displayed as the emphasis display process according to the degree of grace. FIG. 16 depicts an example of a display in which the degree of grace up to the designated date and time is represented by the flickering interval of the designated date and time to be displayed.

Specifically, as shown in FIG. 16, the emphasis display processing unit 102*e* always turns on the designated date and time to be displayed when the degree of grace is a normal level. When the degree of grace is a caution level, the emphasis display processing unit 102*e* flickers the designated date and time to be displayed at an interval of 2 seconds. When the degree of grace is a warning level, the emphasis display processing unit 102*e* flickers the designated date and time to be displayed at an interval of one second. The flickering interval according to the degree of grace can freely be set.

[Degree of Grace: Flickering Interval of Image]

Figure 17:
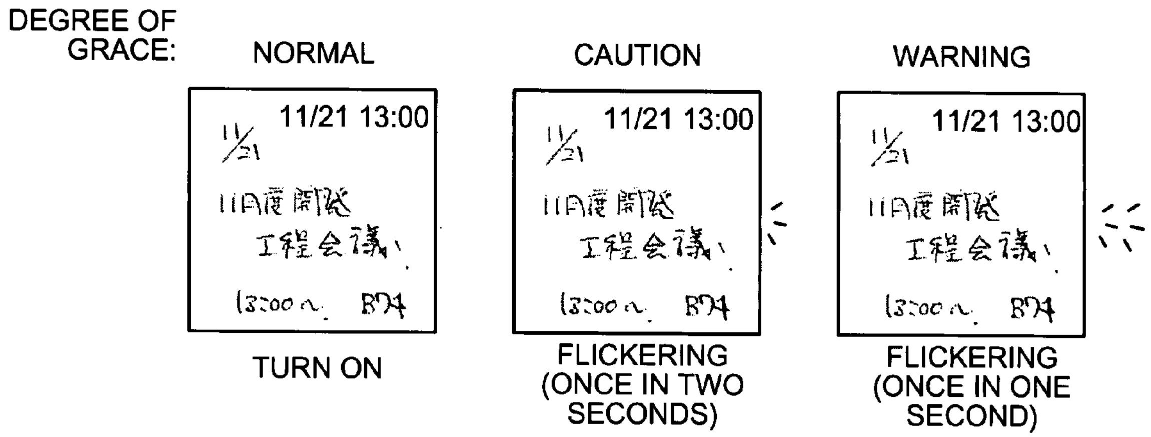
FIG. 17 is a view showing an example of a display in which the degree of grace up to the designated date and time is represented by a flickering interval of a displayed image.

The emphasis display processing unit 102*e* may control to change a flickering interval of an image to be displayed as the emphasis display process according to the degree of grace. FIG. 17 depicts an example of a display in which the degree of grace up to the designated date and time is represented by the flickering interval of the image to be displayed.

Specifically, as shown in FIG. 17, the emphasis display processing unit 102*e* always turns on the image to be displayed when the degree of grace is a normal level. When the degree of grace is a caution level, the emphasis display processing unit 102*e* flickers the image to be displayed at an interval of two seconds. When the degree of grace is a warning level, the emphasis display processing unit 102*e* flickers the image to be displayed at an interval of one second.

[Degree of Grace: Color of Image]

Figure 18:
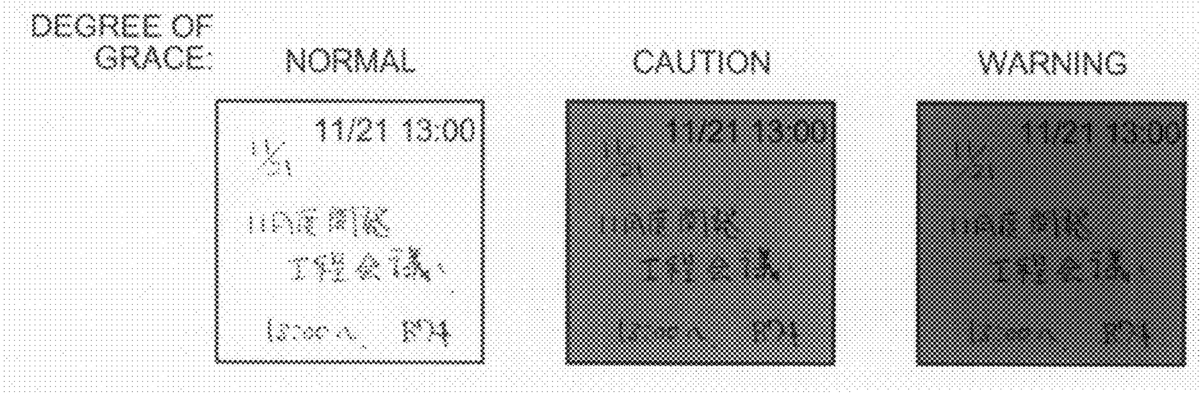
FIG. 18 is a view showing an example of a display in which the degree of grace up to the designated date and time is represented by a color of the displayed image.

The emphasis display processing unit 102*e* may control to change a color of characters of an image to be displayed as the emphasis display process according to the degree of grace. FIG. 18 depicts an example of a display in which the degree of grace up to the designated date and time is expressed by a color of an image to be displayed.

Specifically, as shown in FIG. 18, when the degree of grace is a normal level, the emphasis display processing unit 102*e* represents the characters of the image to be displayed with a normal color (e.g., monotone color). When the degree of grace is a caution level, the emphasis display processing unit 102*e* represents the characters of the image to be displayed with a caution color (e.g., orange). When the degree of grace is a warning level, the emphasis display processing unit 102*e* represents the characters of the image to be displayed with a warning color (e.g., red). The normal color, caution color, and warning color can freely be set.

The detailed explanation of the emphasis display processing is now ended. The specific example of the emphasis display process is not limited to the above-mentioned case. The emphasis display processing unit 102*e* may control to change the color of the image to be displayed, color of the frame of the image, thickness or concentration of the characters of the image, flickering interval of the display of the designated date and time, flickering interval of the image, size, thickness, concentration, or color of the display of the designated date and time, etc. according to the priority (absolute value), order of priority (relative value), degree of grace, or order of degree of grace (e.g., length of the period).

[Link Control Process]

Figure 19:
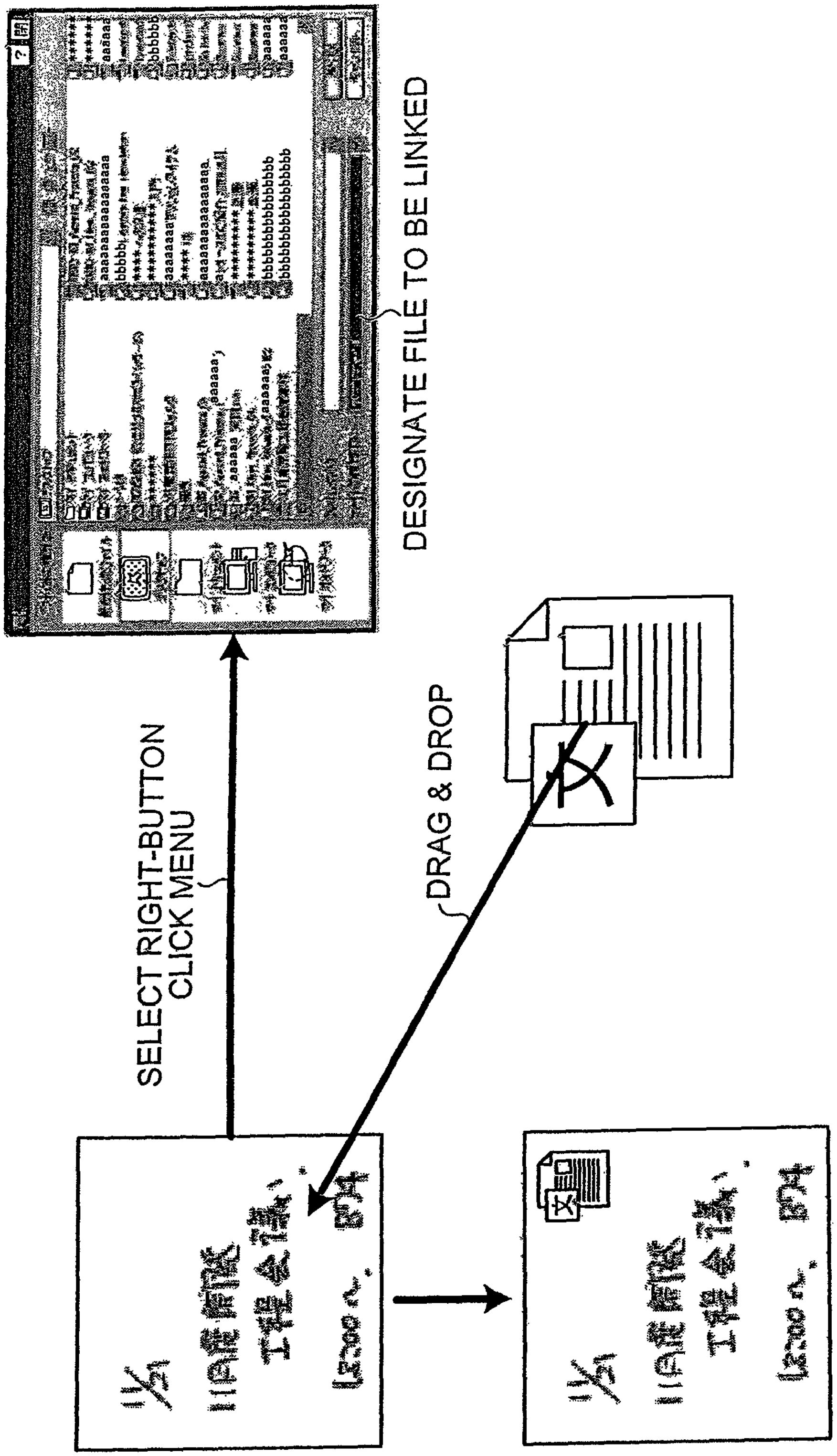
FIG. 19 is a conceptual view showing one example of a link control process.

A link control process by the process of the link controlling unit 102*g* will be explained with reference to FIG. 19. FIG. 19 is a conceptual view showing one example of the link control process.

First, as shown in FIG. 19, the link controlling unit 102*g* controls to cause a user to designate a file relating to the image displayed on the display screen by the process of the display controlling unit 102*b*. As a specific example, the link controlling unit 102*g* may control to cause a user to drag-and-drop a file to be linked on the image on the display screen. When a right-button click is performed by a user through a mouse on the image on the display screen and a user selects a "link file designation" from a menu list, the link controlling unit 102*g* may display a file list and control to cause the user to designate the file to be linked from the file list.

Then, the link controlling unit 102*g* controls to link the file designated by the user with the image. Specifically, the link controlling unit 102*g* stores positional information of the designated file into the sticky note image file 106*a* as associated with the designated image information. The link controlling unit 102*g* may control to display an icon of the linked file on a part of the image displayed on the display screen. The explanation of the link control process is now ended.

[History Information Storing Process]

Figure 20:
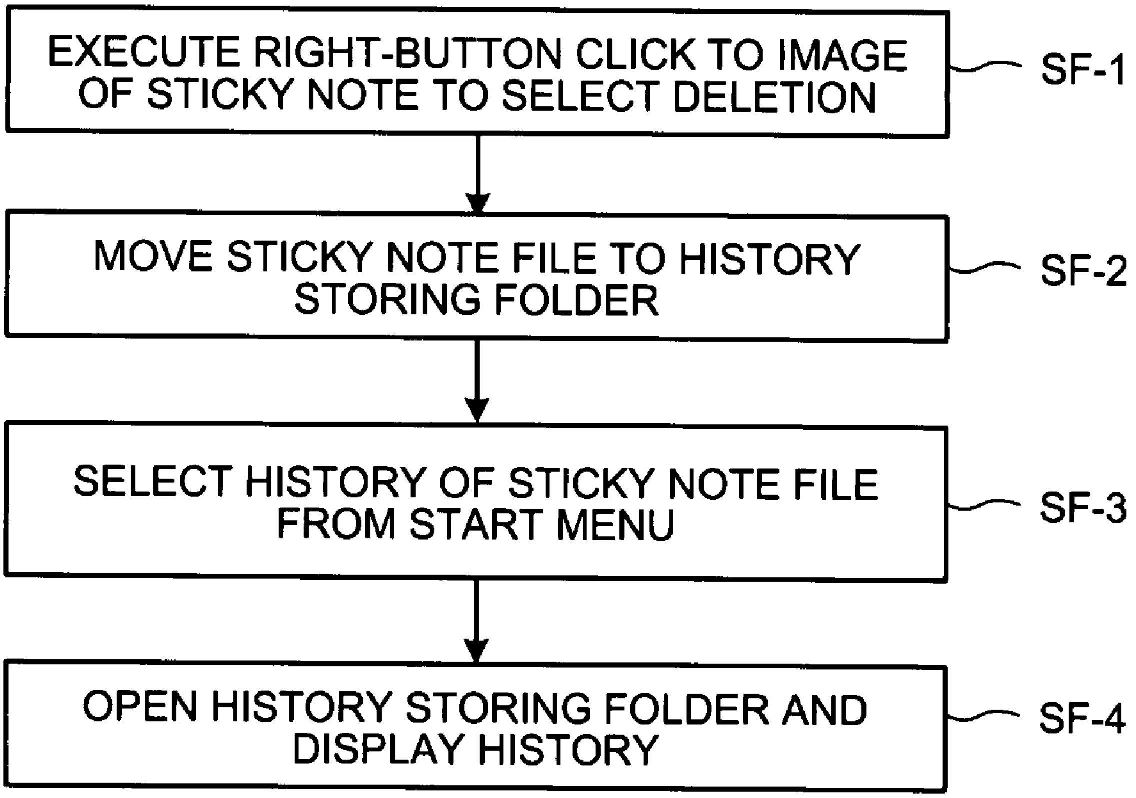
FIG. 20 is a flowchart showing one example of a history information storing process.
Figure 21:
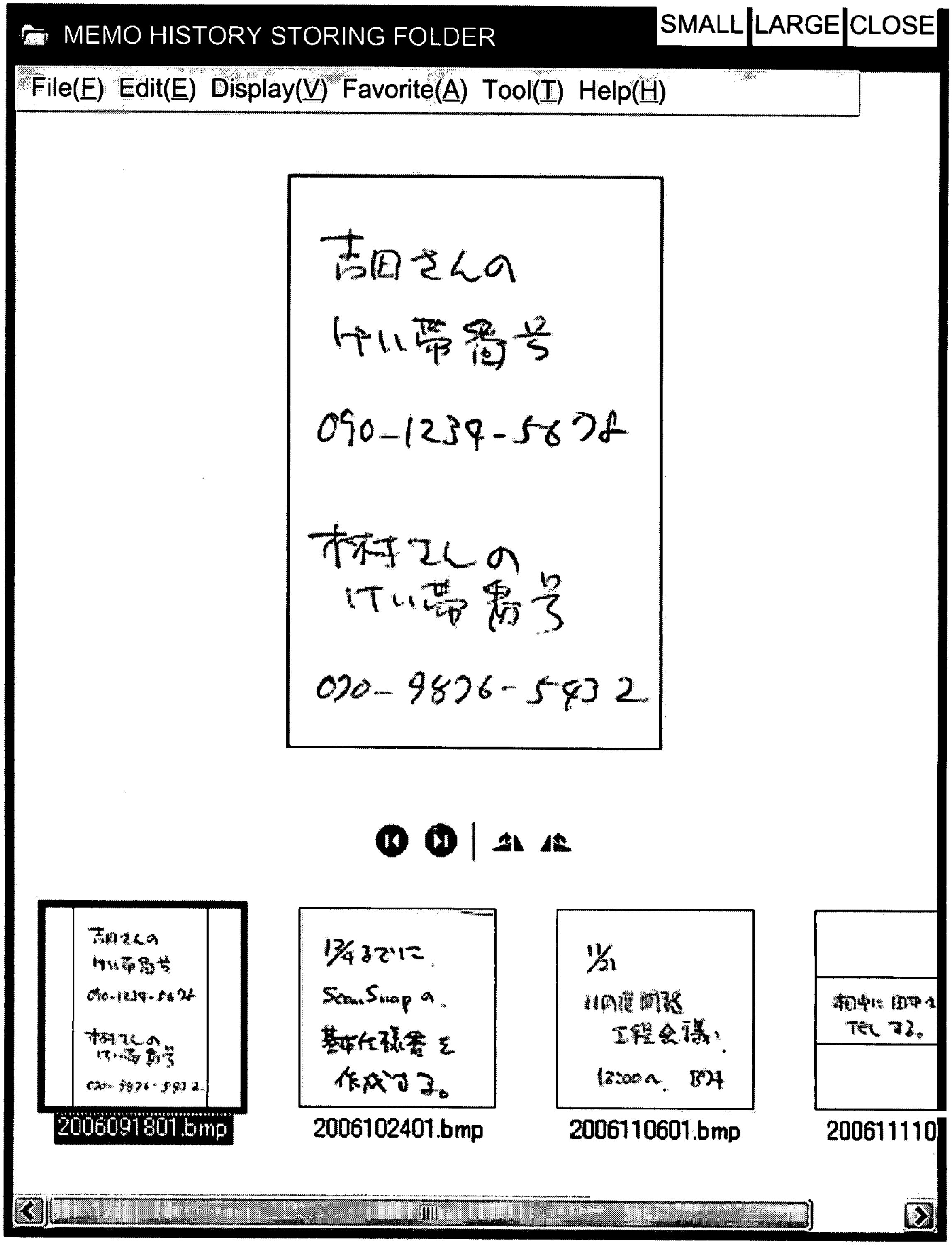
FIG. 21 is a view showing one example of history information (log information) stored in a history storing folder by the history information storing process.
Figure 22:
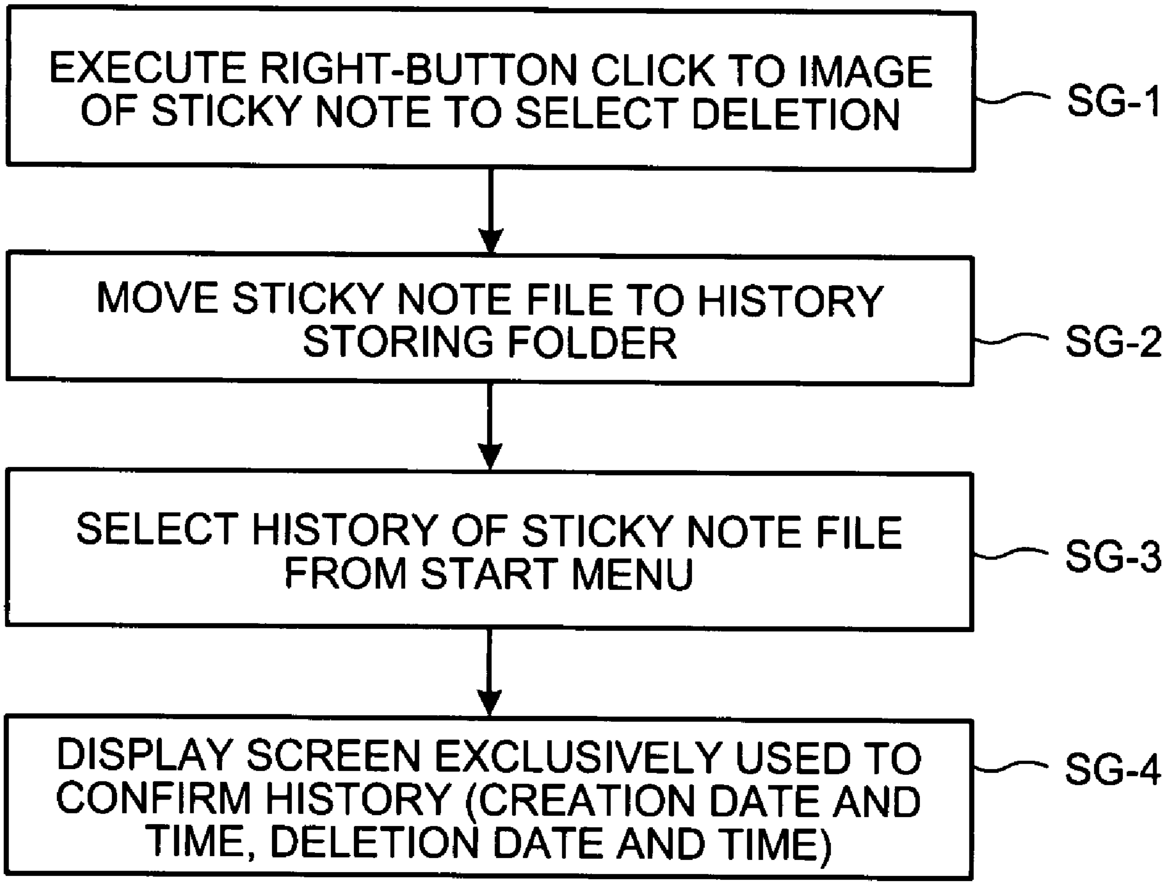
Figure 23:
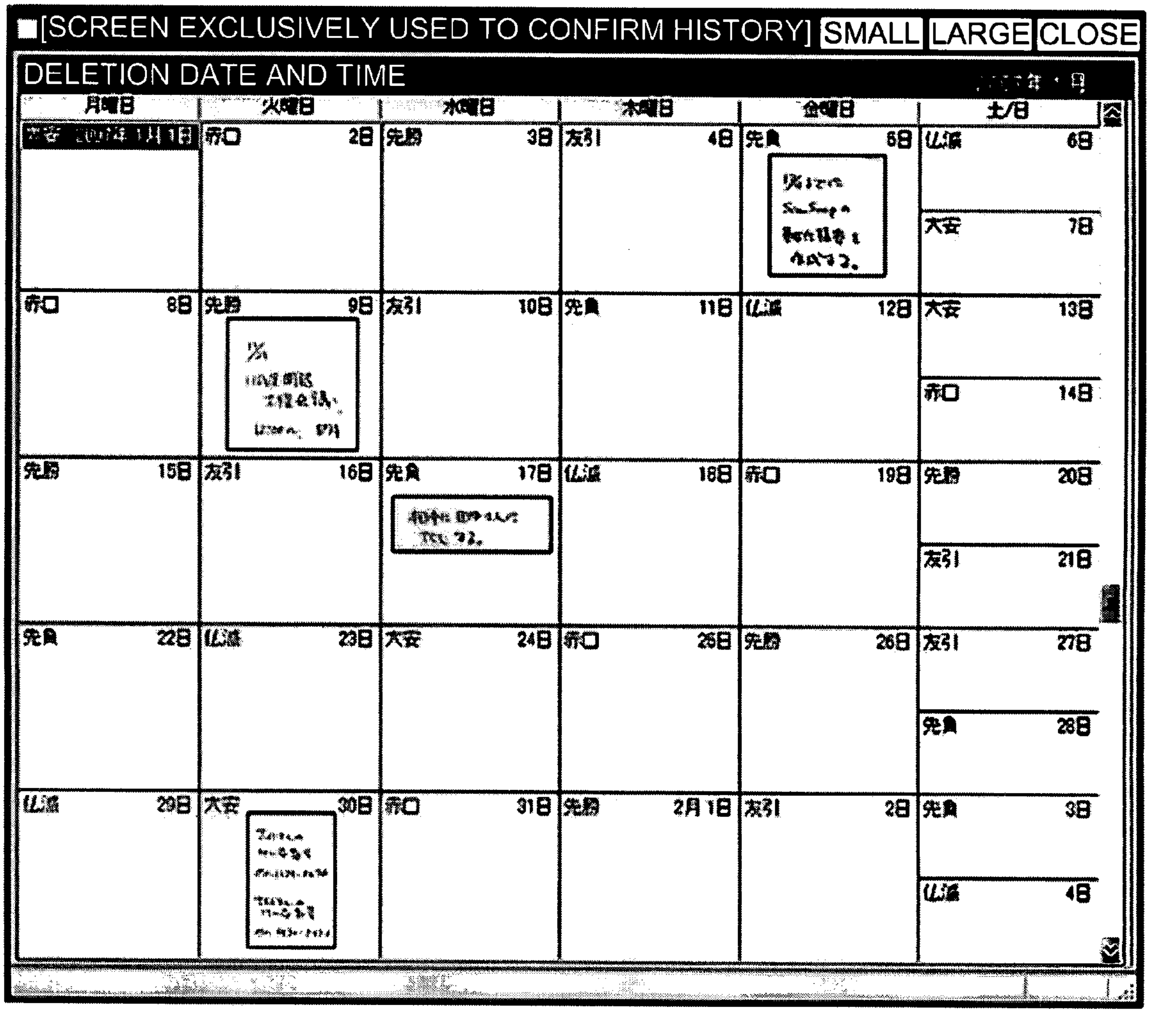
FIG. 23 is a view showing one example of the history information (log information) stored in the history storing folder as associated with the deletion date or the like by the history information storing process.

A history information storing process by the process of the history information management unit 102*h* will be explained with reference to FIGS. 20 to 23. FIG. 20 is a flowchart showing one example of the history information storing process. FIG. 21 is a view showing one example of history information (log information) stored in the history storing folder by the history information storing process. FIG. 22 is a flowchart showing one example of the history information process in which the image information is stored as associated with a deletion date and time, etc. FIG. 23 is a view showing one example of the history information (log information) stored in the history storing folder as associated with the deletion date and time, etc. by the history information storing process.

As shown in FIG. 20, when the user gives an instruction to delete image information, the history information management unit 102*h* first moves the instructed image information to the history storing folder 106*b*. Specifically, when the user operates the mouse to perform a right-button click on the image on the display screen and the user selects "deletion of sticky note" from the menu list (step SF-1), the history information management unit 102*h* moves the image information, which is instructed to be deleted, to the history storing folder 106*b* from the sticky note image file 106*a* (the image that is instructed to be deleted is not displayed on the display screen) (step SF-2).

Accordingly, the sticky note display processing device 100 can realize a log function. Specifically, as shown in FIG. 21 as one example, when the user selects the "history of sticky note" from a start menu (step SF-3), the history information management unit 102*h* refers to the history storing folder 106*b* to display the stored history information (log information) (step SF-4). Thus, the user confirms the deleted image information from the display of the screen shown in FIG. 21.

The history information management unit 102*h* may control to store the image information, which is instructed to be deleted, into the history storing folder 106*b* as associated with the data and time when the image information is created or the date and time when the image information is deleted.

Specifically, as shown in FIG. 22, when the user operates the mouse to perform the right-button click on the image on the display screen and the user selects the "deletion of sticky note" from the menu list (step SG-1), the history information management unit 102*h* moves the image information, which is instructed to be deleted, to the history storing folder 106*b* from the sticky note image file 106*a* to be stored as associated with the deletion date and time (step SG-2). Thus, when the user selects the "history of sticky note file" from the start menu (step SG-3), the history information management unit 102*h* refers to the history storing folder 106*b* and displays the stored history information (log information) and the deletion date and time as associated with each other (step SG-4). Since a screen (screen exclusively used to confirm history) shown in FIG. 23 is displayed, the user can confirm the deleted image information and the deletion date and time as associated with each other. The history information management unit 102*h* may control to store the image information as associated with the creation date and time, and when the screen exclusively used to confirm history is displayed, it may perform a process of switching the display associated with the creation date and time and the display associated with the deletion date and time.

[Other Embodiments]

The embodiment of the present invention has been explained. The present invention can be embodied by the other various different embodiments within the technical scope disclosed in the claims, in addition to the aforesaid embodiment.

For example, the aforesaid embodiment describes the case in which the sticky note display processing device 100 performs processing in a stand-alone manner. However, the sticky note display processing device 100 may perform processing in accordance with a request from a client terminal that is made by a housing different from the sticky note display processing device 100, and the sticky note display processing device 100 may be configured to return the processing result to the client terminal.

All or some of the processes that are explained as being automatic in the processes explained in the embodiment can be done manually. Alternatively, all or some of the processes that are explained as being manual can be done automatically by a known method. Besides, the process procedure, control procedure, specific name, information including registered data or parameter such as searching condition for each process, example of screen, and database structure, which are described in the specification and drawings, can arbitrarily be changed except being specially mentioned.

The components of the sticky note display processing device 100 shown in the figures are illustrated only schematically and functionally, and it is not necessary to physically have the configuration as illustrated in the figures.

For example, all or some of the process functions of each device in the sticky note display processing device 100, in particular, the process functions performed by the control device 102, can be realized by a CPU (Central Processing Unit) and a program that can be interpreted and executed by the CPU. Alternatively, they can be realized by a hardware containing wired logic. The program is recorded onto a recording medium described later, and mechanically read by the sticky note display processing device 100 according to need. Specifically, the storage device 106 or the like such as ROM or HD has recorded thereon a computer program that gives a command to the CPU in cooperation with OS (Operating System) to perform various processes. The computer program is loaded to RAM to be executed, and composes the control unit in cooperation with the CPU.

The computer program may be stored in an application program server connected to the sticky note display processing device 100 through an arbitrary network 300. All or some of the computer programs can be downloaded according to need.

The program according to the present invention can be stored in a computer-readable recording medium. The "recording medium" includes arbitrary "portable physical media" such as a flexible disk, magneto-optical disk, ROM, EPROM, EEPROM, CD-ROM, MO, and DVD, or "communication medium" that can retain a program in a short period such as a communication line or carrier wave when the program is transmitted through a network represented by LAN, WAN, and Internet.

The "program" is a data processing method described in an arbitrary language or notation. It does not care about a format of a source code or binary code or the like. The "program" is not limited to one independently made, but includes one distributed into plural modules or libraries, or one that achieves its function in cooperation with the other program, represented by OS (Operating System). Known constitutions or procedures can be used for the specific constitution for reading the recording medium, reading procedure, or install procedure or the like after the reading in each device shown in the embodiment.

Various databases or the like (such as sticky note image file 106*a* or history storing folder 106*b*) stored in the storage device 106 are storage means such as a memory device such as RAM or ROM, fixed disk device such as a hard disk, flexible disk, and optical disk, and store various programs used for various processes or providing website, table, database, file for web page.

The sticky note display processing device 100 may be realized by connecting to an information processing device such as an existing personal computer or work station, and mounting a software (including program, data, etc.) that causes the information processing device to realize the method of the present invention.

The distribution and integration of the device are not limited to those illustrated in the figures. All or some of the devices can be functionally or physically distributed or integrated in an arbitrary unit according to various attachments.

As explained above, the present invention can provide a sticky note display processing device, sticky note display processing method and program, and recording medium that can automatically display a memo image, etc., which is taken by a scanner or digital camera, at a free space on a display screen with an appropriate size (e.g., visible minimum size).

Since the present invention has such as a character recognizing function, link function and log function, the present invention can easily make a search, make a link, make a log management, share, or make an e-mail from image information.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A sticky note display processing device connected to an image reading device and a display device and provided with at least a storage device and a control device, wherein said control device comprises:

an image reading unit that controls said image reading device to read an image on a sticky note; and a display controlling unit that determines a character area of a character of said image read by said image reading unit adjusts a size of said image that should be displayed on a display screen of said display device, on the basis of said determined character area and displays said image as enlarged or reduced, and controls a position of said image in such a manner that said image is displayed at a position of said display screen where there is no display.

2. The sticky note display processing device according to claim 1, wherein said display controlling unit determines said character area by encircling an individual character of said read image with a rectangle, and adjusts said size of said image on the basis of the area of said rectangle.

3. The sticky note display processing device according to claim 1, wherein said display controlling unit divides the display area of said display screen into plural sections, and controls said position of said image that should be displayed on said display screen by searching one or continuous plural sections that are said display area of said display screen where there is no display and that can display said adjusted size.

4. The sticky note display processing device according to claim 1, wherein said control device further comprises character recognizing unit that recognizes character information from said image.

5. The sticky note display processing device according to claim 1, wherein said image reading unit detects a linear portion through a differential process of said image that is read through the control of said image reading device, selects the outermost polygon from polygons made by said detected linear portions, and extracts said image in said polygon, thereby reading said image on said sticky note.

6. The sticky note display processing device according to claim 1, wherein said display controlling unit comprises emphasis display processing unit that controls to cause a user to input priority of said image and controls to display said image as emphasized in accordance with the priority or the order of priority.

7. The sticky note display processing device according to claim 1, wherein said display controlling unit comprises emphasis display processing unit that controls to cause a user to designate a date and time relating to said image, and controls to display said image as emphasized in accordance with a degree of grace based upon a period between said designated date and time and the current date and time.

8. The sticky note display processing device according to claim 7, wherein said emphasis display processing unit controls to display said image by changing a color of said image to be displayed, a color of a frame of said image, thickness of a character of said image, flickering interval of the display of said designated date and time, flickering interval of said image, or size, thickness or color of the display of said designated date and time.

9. The sticky note display processing device according to claim 8, wherein the control to change said thickness of said character of said image is a control in which said image is binarized, and plural black dots are added to the surrounding of the black dot of said binarized image and superimposed onto the original image.

10. The sticky note display processing device according to claim 1, wherein said control device comprises link controlling unit that causes a user to designate a file relating to said image displayed on said display screen by said display controlling unit and links said image with said designated file.

11. The sticky note display processing device according to claim 1, wherein said control device comprises history information management unit that, when a user gives an instruction to delete said image information, moves said instructed image information to a history storing folder of said storage device.

12. A sticky note display processing method that is executed by a sticky note display processing device connected to an image reading device and a display device and provided with at least a storage device and a control device, comprising:

an image reading step in which said image reading device is controlled to read an image on a sticky note; and a display controlling step in which a character area of a character of said image read by said image reading unit is determined, a size of said image that should be displayed on a display screen of said display device is adjusted on the basis of said determined character area and displays said image as enlarged or reduced, and a position of said image having said size is controlled in such a manner that said image is displayed at a portion of said display screen where there is no display, the steps being executed by said control device.

* * * * *